United States Patent [19]

Hamelers et al.

[11] Patent Number: 5,337,898
[45] Date of Patent: Aug. 16, 1994

[54] METHOD FOR PROCESSING VEGETABLE, FRUIT AND GARDEN WASTE

[75] Inventors: Bertus V. M. Hamelers, Heelsum; Johan A. Woelders, Twello, both of Netherlands

[73] Assignee: N.V. Vuilafvoer Maatschappij Vam, Amsterdam, Netherlands

[21] Appl. No.: 51,240

[22] Filed: Apr. 23, 1993

[30] Foreign Application Priority Data

Apr. 24, 1992 [NL] Netherlands .................. 9200751

[51] Int. Cl.⁵ .................. B03B 7/00; C05F 11/08
[52] U.S. Cl. .................. 209/10; 209/17; 209/38; 209/39; 209/44.4; 209/930; 71/9; 71/10; 210/605; 210/630; 435/267
[58] Field of Search .............. 209/10, 235, 930, 12; 71/9, 10, 23, 901; 210/603, 605, 617, 620, 630; 435/266, 267, 287, 288

[56] References Cited

U.S. PATENT DOCUMENTS

| | | | |
|---|---|---|---|
| 3,579,320 | 5/1971 | Perres | 71/10 X |
| 3,597,308 | 8/1971 | Brooks | 209/10 X |
| 4,137,158 | 1/1979 | Ishida et al. | 71/10 X |
| 4,252,901 | 2/1981 | Fischer et al. | 435/288 X |
| 4,276,155 | 6/1981 | Roeschlaub et al. | 209/10 |
| 4,565,552 | 1/1986 | Cotton | 71/10 X |
| 4,758,344 | 7/1988 | Wildenauer | 71/9 X |
| 4,879,048 | 11/1989 | Kreyenberg | 209/10 X |

FOREIGN PATENT DOCUMENTS

| | | |
|---|---|---|
| 0431212 | 6/1991 | European Pat. Off. . |
| 811821 | 6/1951 | Fed. Rep. of Germany . |
| 3545679 | 6/1987 | Fed. Rep. of Germany . |
| 2534274 | 4/1984 | France .................. 71/10 |
| 2593724 | 8/1987 | France . |
| 2619025 | 2/1989 | France . |

*Primary Examiner*—D. Glenn Dayoan
*Assistant Examiner*—Tuan N. Nguyen
*Attorney, Agent, or Firm*—Bacon & Thomas

[57] ABSTRACT

Method for processing vegetable, fruit and garden waste, indicated as VFG-waste, in which, after a presorting has taken place, the waste (3) is brought into a washing-separating device (4), in which, with the help of water, the waste is separated into a coarse organic fraction (6) which is composted and into a residual fraction (7). The coarse fraction contains particles larger than 2 up to 4 mm. The residual fraction (7) is separated into an inert fraction (11) for recovering sand (13) therefrom, and into a fraction (15) consisting of liquid containing a fine organic fraction (17) and substances dissolved and colloidally divided in the liquid. The fraction (15), obtained from the residual fraction (7) after removing the inert fraction (11) therefrom, is subjected to an anaerobic stabilization.

3 Claims, 1 Drawing Sheet

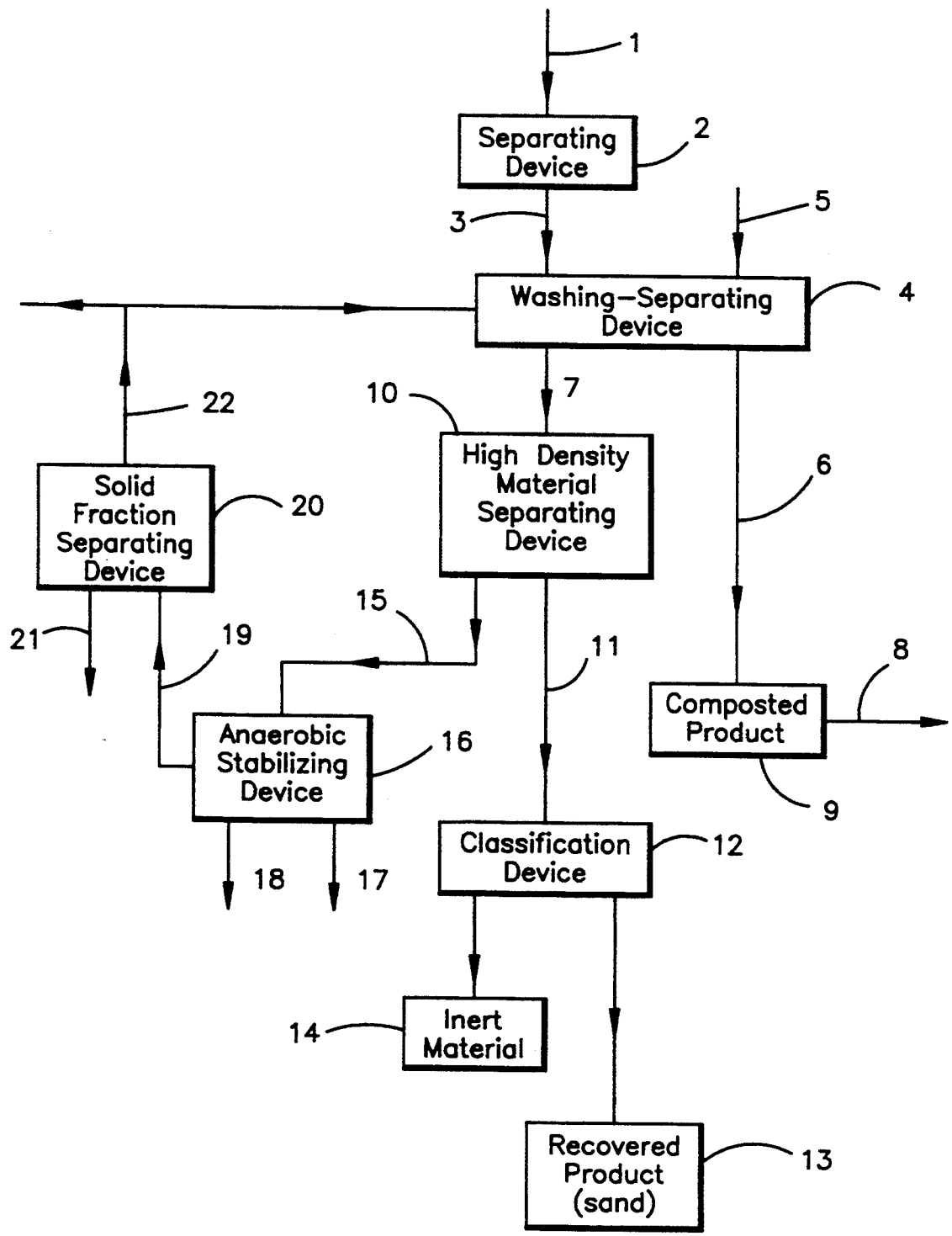

METHOD FOR PROCESSING VEGETABLE, FRUIT AND GARDEN WASTE

BACKGROUND OF THE INVENTION

The invention relates to a method for processing vegetable, fruit and garden waste, indicated briefly as VFG-waste, in which the waste is brought into a washing-separating device and is divided into two fractions with the help of water.

Such a method is known from the German patent 811.821. Therein, a separation of the waste into fractions of different densities takes place in that the fraction with the lowest density will end up floating on the water. This fraction is removed from the surface of the water and will substantially consist of organic material. The remaining fraction will substantially consist of sand and similar materials.

After the material of low density has been removed from the water used for washing, the water will contain dissolved and colloidally divided fractions, particularly salts, well-soluble nutrients and various acids. Thus, it will have to be cleaned before it can be re-used or drained. Further, it has appeared that the heavy metals nearly always present in VFG-waste, will substantially adhere to the finer particles and thus partially end up in the separated organic material, since this will contain both coarse and fine particles.

In further processing of the organic material, two different methods, namely aerobic composting and anaerobic fermentation, are applied in practice.

The difficulty of composting lies mainly in the fact that many odours arise, and of fermentation in the fact that it requires a considerable investment in equipment and is therefore an expensive process, although one can obtain biogas by it. It will also be appreciated that in both cases heavy metals can be present in the final material.

SUMMARY OF THE INVENTION

The invention intends to provide a method by which the above-mentioned difficulties are removed and one obtains a high quality compost having physical and chemical characteristics being close to those of peat. Through this, excavation of bog can be limited and furthermore, various useful can be recovered.

The method according to the invention is characterized in that with the help of the washing-separating device, the VFG-waste is separated into a coarse organic fraction, which is separated from the water used and is composted, and into a finer residual fraction remaining behind in the used water, which residual fraction, after separating the inert fraction therefrom, is subjected to an anaerobic stabilization.

Thus, there is no separation according to specific density, such as in the known method, but according to particle size. After removing the coarse organic fraction from the used rinsing water, except for the inert fraction, fine organic particles will also remain behind in the water, together with the dissolved and coloidally divided fractions already stated above.

It has appeared that on composting the coarse organic fraction, less odour emission takes place, since the substances producing this emission will in particular be present in the water containing the residual fraction.

The coarse organic fraction will preferably consist of particles having a size of more than from 2 up to 4 mm.

In order to separate the coarse organic fraction, one will therefore preferably use a sieve having a sieve size of 2 up to 4 mm.

According to another development of the invention, the inert fraction separated from the rinsing water is subjected to a classification and separated into a fraction substantially consisting of sand and a residual fraction. In particular the sand obtained can be used as building material and thus perform a much more useful function than when it ends up in the produced compost.

Finally, a fine organic fraction remains behind in the rinsing water, as well as a dissolved and a colloidal divided fraction such as clay. As stated above, these last mentioned fractions will preferably be processed in an anaerobic way. The equipment necessary for this purpose can be relatively small in size.

Herein, one can recover biogas, which can be used for the process. Further, one obtains a fine organic fraction. Depending on the composition of this fraction, it can be suitable for recycling, will be dumped or will have to be burned.

The solid fraction can be separated from the liquid resulting from the anaerobic reactor, such as by centrifugation, and the obtained liquid can partially be recirculated and partially be discharged from the process.

BRIEF DESCRIPTION OF THE DRAWING

The invention is further explained by means of a diagram which is shown in the enclosed drawing and in which the several steps of the method according to the invention have been indicated.

DETAILED DESCRIPTION OF THE PREFERRED EMBODIMENT

The VFG-waste 1 supplied is subjected to a pre-sorting in a separating device 2, wherein with a barrel sieve or by hand, coarse pieces are removed from the waste to be processed, and the magnetizable materials are removed therefrom by a magnet.

Subsequently, the pre-treated waste 3 gets into the washing-separating device 4 in which the waste is treated with rinsing water 5. The device 4 can comprise a sieve, not further indicated, having a sieve size of 2 up to 4 mm, so that a coarse organic fraction 6 is separated from the rinsing water 7 containing the further materials. This coarse organic fraction 6 is composted. The gases 8 being set free therein are collected and subjected to a treatment for preventing odour emission. The product 9 obtained by composting can possibly be subjected to a cleaning process or a further treatment. One can obtain a product having physical and chemical characteristics which are close to the characteristics of peat.

Subsequently, in the device 10, the inert material 11 with high density is separated from the rinsing water 7 freed of the coarse fraction. In device 12, this material 11 is subjected to a classification, so that for example sand 13 can be recovered, that can be used as building material. The further inert material 14 could consist of glass, stone and similar material.

In a substantially known way, the rinsing water 15 freed of the inert material 11 is subjected to an anaerobic stabilization in the device 16. One obtains a fine fraction 17, biogas 18 and a liquid fraction 19.

The fraction 17 can be suitable for recycling, or can be dumped or will have to be burned. The biogas 18 obtained can be used in the process or be used for other purposes. A solid fraction 21 can be separated from the liquid 19 coming from the device 16, for example by centrifugation in the device 20. The remaining liquid 22 can be partially drained off and be partially supplied to the washing-separating device 4 in order to be recycled.

It will be obvious, that only the main lines of the method according to the invention have been indicated in the diagram and discussed above, and that many modifications and additional treatments of the various materials can be applied without being beyond the inventive idea.

We claim:

1. A method for processing vegetable, fruit and garden waste, referred to as VFG-waste, comprising:

delivering VFG-waste into a washing-separating device which divides the waste, with the aid of water, into a coarse organic fraction and a finer residual fraction;

compositing the coarse organic fraction;

separating an inert fraction from said finer residual fraction;

classifying said inert fraction into a first, inert material fraction and a second, product fraction; and subjecting said finer residual fraction to an anaerobic stabilization.

2. The method according to claim 1, wherein dividing the waste with the water results in coarse organic fraction particles having associated sizes larger than from 2 mm to 2 mm.

3. The method according to claim 1, further comprising separating the coarse organic fraction from the water with a sieve having an associate sieve size from 2 mm to 4 mm.

* * * * *